(No Model.)
E. C. HOWE.
BALL BEARING FOR BICYCLES.
No. 570,428. Patented Oct. 27, 1896.
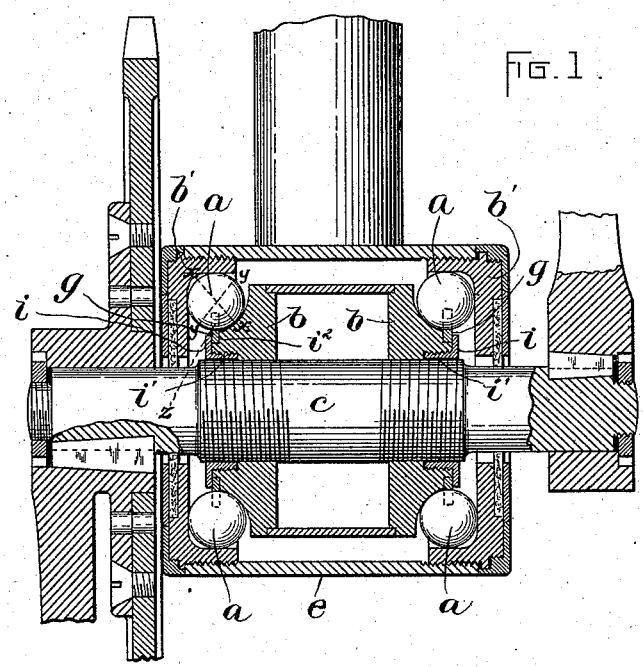
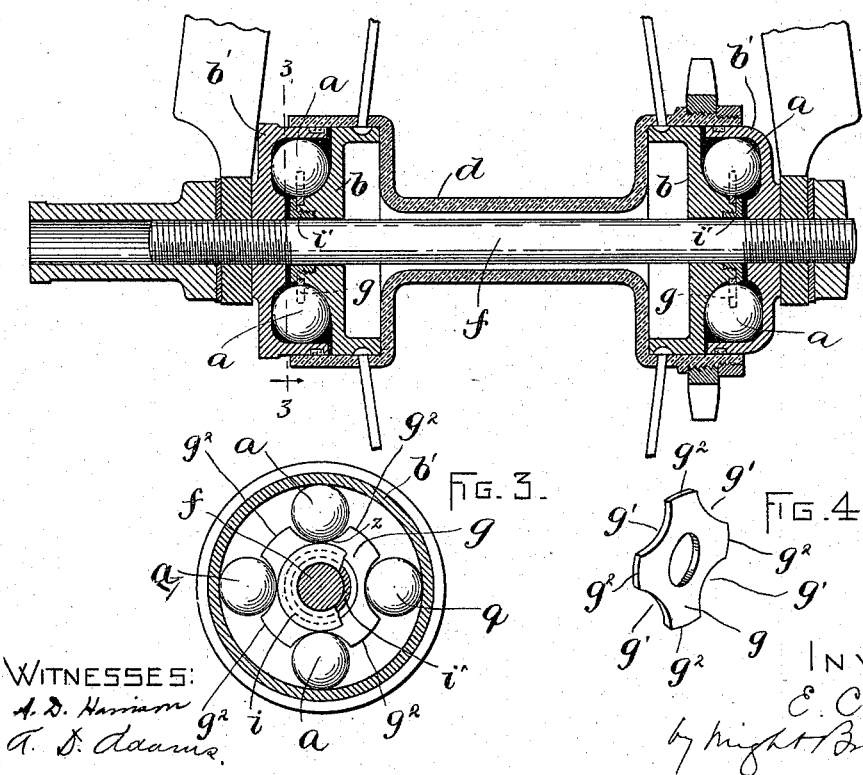
WITNESSES:
A. D. Harrison
A. D. Adams
INVENTOR:
E. C. Howe
by Wright Brown & Quinby
Attys.

UNITED STATES PATENT OFFICE.

ELMER C. HOWE, OF WALTHAM, MASSACHUSETTS, ASSIGNOR TO THE AMERICAN WALTHAM MANUFACTURING COMPANY, OF SAME PLACE.

BALL-BEARING FOR BICYCLES.

SPECIFICATION forming part of Letters Patent No. 570,428, dated October 27, 1896.

Application filed December 23, 1895. Serial No. 572,980. (No model.)

*To all whom it may concern:*

Be it known that I, ELMER C. HOWE, of Waltham, in the county of Middlesex and State of Massachusetts, have invented certain new and useful Improvements in Ball-Bearings for Bicycles, of which the following is a specification.

This invention relates to ball-bearings such as those employed for the wheels and cranks of bicycles; and it has for its object to reduce the number of balls employed in such bearings and prevent rubbing contact between the balls.

The invention consists in the improvements which I will now proceed to describe and claim.

Of the accompanying drawings, forming a part of this specification, Figure 1 represents a longitudinal section of a bicycle-crank hanger provided with my improvement. Fig. 2 represents a longitudinal section of a bicycle-wheel hub and an elevation of the axle on which it is mounted. Fig. 3 represents a section on line 3 3 of Fig. 2. Fig. 4 represents a perspective view of the separating device detached.

The same letters of reference indicate the same parts in all the figures.

In the drawings, $a\,a$ represent the balls, which are interposed between the cones $b\,b$ on the crank-axle $c$ or on the wheel-hub $d$ and the outer bearings or sockets $b'\,b'$ on the hanger-frame $e$ or the fixed axle $f$. The said cones and sockets are or may be of the usual general form and relative arrangement, the balls being interposed between them, as shown.

In carrying out my invention, I provide spacing-plates $g$, which are engaged loosely with the cones $b$ in such manner that they project outwardly from the bases of the cones into the ball-receiving spaces between the cones and the sockets, the said plates having recesses $g'$ formed to receive the balls and intermediate projections $g^2$, which project between the balls and keep the balls of each series separated from each other, as indicated in Fig. 3. The loose connection of the separating-plates with the cones is such as to enable said plates to rotate independently of the cones, as required by the variation between the rate of movement of the cones and the balls. I have here shown the separating-plates as engaged with the cones by means of flanges $i\,i$, formed on screw-threaded sleeves $i'\,i'$, which are screwed into threaded cavities in the cones $b\,b$, the cones being recessed at $i^2$, forming shoulders to receive the inner edges of the separating-plates, so that each plate is prevented from lateral movement in one direction by the cone and in the opposite direction by the flange $i$. The recesses $g'$ in the separating-plates are preferably made on a circle of longer radius than the radius of the balls, so that there will be the minimum extent of contact between each ball and the separating-plate, as shown in Fig. 3. The balls therefore rotate in contact with the separating-plate with the minimum frictional resistance, and are separated by the plate, so that they cannot come in contact with each other. This arrangement not only obviates the frictional resistance due to the contact of one ball with another when the balls are arranged in a continuous series as heretofore, but it also reduces the number of balls, thus diminishing the weight and reducing the expense of construction.

I do not limit myself to the described means of securing the separating-plates against lateral displacement, and may secure them in any other suitable way, it being desirable, however, to provide some means for keeping each plate about in the plane of the centers of the series of balls with which it coöperates.

By my construction I provide for the minimum amount of resistance to the travel of the balls and the least amount of friction between the balls and the separating-plate. The plane of rotation of the balls is on the line $x\,x$, while the axis of rotation is on the line $y\,y$. (See Fig. 1.) Owing to the location of the single flat plate $g$ for each set of balls between the axial line and the plane of rotation and the fact that the recesses $g'$ are made on the arc of a circle larger than that of the balls, the point of contact between each ball and the plate is brought as close to the axis of rotation of the ball as is possible and yet permit the traveling movement of the balls to rotate the spacing-plate. The point of contact is indicated at $z$ in Figs. 1 and 3, and by a comparison of the two figures it will be seen that the wear between the balls and the spacing-plate will be slight, since the points of contact are close to the axes of rotation of the balls. Said points of contact cannot be at the axis of rotation of the balls, but they are removed as far as possible from the periphery or "tread" of the balls, to avoid as much as possible resistance and friction.

I claim—

In a bearing of the class referred to, in combination with a cup and cone, balls mounted to travel in the annular space between said cup and cone, and a separator-plate notched to receive said balls, said plate being revolubly mounted at the small end of the cone.

In testimony whereof I have signed my name to this specification, in the presence of two subscribing witnesses, this 19th of December, A. D. 1895.

ELMER C. HOWE.

Witnesses:
 C. F. BROWN,
 A. D. HARRISON.